United States Patent [19]

Bullister

[11] Patent Number: 5,751,275
[45] Date of Patent: May 12, 1998

[54] TWO— AND THREE—DIMENSIONAL TRACKBALL WITH COORDINATE TRANSFORMATIONS

[76] Inventor: Edward T. Bullister, 86 Concord St., Newton, Mass. 02162

[21] Appl. No.: 337,979
[22] Filed: Nov. 14, 1994
[51] Int. Cl.$^6$ .................................................. G09G 5/08
[52] U.S. Cl. .................................... 345/167; 345/164
[58] Field of Search .................................. 345/157, 167, 345/163, 164; 341/5, 31; D14/114

[56] References Cited

U.S. PATENT DOCUMENTS

| | | | |
|---|---|---|---|
| 3,625,083 | 10/1969 | Bose | 74/471 XY |
| 3,643,148 | 2/1972 | Brown | 318/628 |
| 4,404,865 | 9/1983 | Kim | 74/471 XY |
| 4,811,608 | 3/1989 | Hilton | 73/862.04 |
| 4,933,670 | 6/1990 | Wisloc | 340/709 |
| 4,961,138 | 10/1990 | Gorniak | 364/200 |
| 5,008,528 | 4/1991 | Duchon | 250/221 |
| 5,019,809 | 5/1991 | Chen | 340/815.31 |
| 5,122,654 | 6/1992 | Koh et al. | 250/221 |
| 5,132,672 | 7/1992 | Clark | 340/710 |
| 5,171,978 | 12/1992 | Mimlitch | 250/221 |
| 5,181,181 | 1/1993 | Glynn | 364/566 |
| 5,223,709 | 6/1993 | Pettypiece, Jr | 250/229 |
| 5,237,311 | 8/1993 | Mailey | 340/710 |
| 5,248,961 | 9/1993 | Fujii | 345/167 |
| 5,296,871 | 3/1994 | Paley | 345/163 |
| 5,298,919 | 3/1994 | Chang | 345/163 |

OTHER PUBLICATIONS

K. B. Evans, et al.; Computer Graphics, v 15, No. 3; Tablet-based Valuators that Provide One, Two, or Three Degrees of Freedom; Aug. 1, 1981; 7pgs, pp. 91–97.

"Spaceball 301 User's Manual", Spaceball Technologies, 1991.

101 Key Enhanced Keyboard,with built–in trackball, Advertising literature, Computer City.

Kensington Turbo Mouse 4.0 Advertisement, MacWarehouse Catalog, 1994.

Stingray Trackball Advertisement, MacWarehouse Catalog, 1994, p. 211.

Legend Ball Advertisement, Brochure, Hi Electric Co., Ltd. (The applicant became aware of this brochure at a conference on Nov. 17, 1994. The applicant is not aware of the date of publication of this brochure.)

*Primary Examiner*—Richard Hjerpe
*Assistant Examiner*—Vui T. Tran

[57] ABSTRACT

An improved trackball includes a nonplanar retainer and tapered sensors. A method is given to measure trackball rotations about nonorthogonal axes and transform these to rotations about standard Cartesian coordinates. The large area of the ball exposed by the nonplanar retainer and the flexibility afforded in locating the sensors facilitate a trackball which can respond to both two- and three-dimensional ball rotations.

21 Claims, 6 Drawing Sheets

TWO— AND THREE— DIMENSIONAL TRACKBALL WITH COORDINATE TRANSFORMATIONS

BACKGROUND—FIELD OF INVENTION

This invention relates to a trackball device providing an interface between a user and a computer for the input of two- and three-dimensional spatial coordinates, and to a method of transforming trackball rotations from nonorthogonal sensors to standard Cartesian coordinates.

BACKGROUND OF THE INVENTION

Tracking devices such as trackballs and mice are used in modern computer systems for a variety of purposes. A user can use them to tell a computer to move a cursor on a computer display. The ability to control a cursor is an integral part of the graphical user interfaces (GUIs) common in modern window-based computing systems.

Trackballs are also used to input spatial translational and rotational coordinates into computer systems. This is commonly done in drafting and computer-aided-design packages. In these applications packages, the motion of the pointing device is used to define corresponding locations in a coordinate system in the applications package.

The physical design of a typical trackball is described in U.S. Pat. No. 5,122,654 to Kanas Koh and Josef Bismanovsky, issued on Jun. 16, 1992. In the descriptions of trackballs provided below, all rotations and orientations are with respect to a sphere coextensive with the surface of a ball and fixed with respect to a trackball housing.

A ball is enclosed within a housing. A portion of one hemisphere of the ball is exposed to be rolled by a user's hand or finger(s). Two sensors mounted on a horizontal circuit board sense the ball rotation and generate signals that correspond to the rotation and communicate them to a computer. Each sensor contains a cylindrical roller which contacts the ball in a small area about a nominal, centralized contact point. The rollers' axes are mutually orthogonal and parallel to the circuit board. The rollers contact the sphere in the bottom hemisphere (below the equator), and roll along great circles of the sphere orthogonal to the equator (meridians). These typical circuit board mounted sensors measure ball rotations about axes parallel to the circuit board but do not measure rotation about the axis perpendicular to the circuit board.

Trackballs are preferred over mice in portable computers because they can be built into the portable computer and need not translate relative to any fixed surface. Trackballs do not require the open flat surface over which a mouse must move.

Often, an undesirably bulky and protruding trackball mount is the best that manufacturers can achieve and in light of the difficulties that have been encountered in locating the trackball in portable computers. In other designs the trackball must be detached or retracted within the computer for transport. In typical transportable trackballs, a retainer ring (which must be removable for cleaning the ball) leaves less than one half (one hemisphere) of the ball surface exposed. Furthermore, size constraints imposed in compact portable computer designs limit the size of the ball itself. The limited exposed area of these small balls limits accuracy and results in poor ergonomics.

In the current art, the specification of three-dimensional (3-D) coordinates, and, in particular, the specification of 3-D rotational coordinates, can be extremely difficult. Several approaches have been developed, each of which has inherent problems.

In a first approach, a three-axis trackball is described in the article "Tablet-based Valuators that Provide One, Two, or Three Degrees of Freedom", by K. B. Evans, et. al. in Computer Graphics, V 15, No. 3 (Aug. 1, 1981) at p. 95. This 3-D trackball has three sensors which convert ball rotations about three axes into electrical signals corresponding to three independent coordinates, in contrast to a 2-D trackball, which has two sensors which convert ball rotations about two axes into electrical signals corresponding to two independent coordinates. This 3-D trackball is simply a 2-D trackball to which a third sensor has been added. The authors remark that the device is awkward to use because rotation about the z-axis requires one to grip the ball with several fingers in order to twist it.

In the second approach, a sequence of signals from a 2-D input device are used to simulate a signal from a virtual 3-D trackball. An example of such a method is described in U.S. Pat. No. 5,019,809 to Michael Chen (May 28, 1991). Using this technique, the user must imagine a spherical surface on a circle appearing on the screen and manipulate this virtual trackball with a physical trackball or mouse. The additional layer of abstraction separates the user from the sense of directly manipulating the object and compromises accuracy. The patent remarks that this is necessitated by the fact that a physical 3-D trackball cannot be made with the entire top hemisphere of the ball exposed because of the requirement that a sensor be on the equator. Other similar techniques require multiple inputs from the 2-D input device. The first input defines a reference point or rotation axis. The next input defines the rotation with respect to the first input. Several iterations of the two steps are sometimes required. This approach can be esoteric and cumbersome even for design engineers, and is generally not attempted by naive computer users.

A third approach is to supplement the two inputs from a standard 2-D input device with a third input from an auxiliary electromechanical transducer. U.S. Pat. No. 4,933, 670 to Nicholas C. Wislocki (Jun. 12, 1990) describes a 2-D trackball supplemented by inputs from a third, auxiliary transducer actuated by a rotating ring on the top of the ball. This auxiliary ring considerably increases the mechanical complexity of the device and obstructs a portion of the ball surface. U.S. Pat. No. 5,132,672 to Michael R. Clark (Jul. 21, 1992) describes a 2-D trackball supplemented by inputs from a third auxiliary transducer actuated by a conveyor belt or a cylindrical roller. Again, the auxiliary transducer adds considerable size and complexity to the device. Furthermore, an auxiliary transducer artificially distinguishes the third component of input from the other two. Imposing this distinction upon otherwise comparable components of rotation or translation can be confusing and counter-intuitive to the user of the device.

A fourth approach is to use force and torque inputs rather than rotations. Tracking devices measuring force and torque are described in U.S. Pat. No. 4,811,608 to John A. Hilton, issued (Mar. 14, 1989) and in the literature describing the "Spaceball" input device made by Spaceball Technologies, Inc.

The use of torque and force quantities introduces new barriers to the intuitive and natural input of data. For example, a standard trackball effects rotations on an object in the computer by directly rotating the ball. It effects translations on an object by directly translating the surface of the ball. (Translating the surface is in fact equivalent to rotating the ball, but it can be useful to think in terms of translations when translations are being effected.) In contrast, the same rotations and translations must be effected indirectly through forces and torques in the Spaceball. These difficulties become even more apparent when considering the reversal of such a motion. To reverse a motion using a trackball, the velocity-time integral (distance travelled) must be reversed. This merely requires a user to bring his thumb back to its initial position, which can be done easily and accurately. In contrast, to reverse a movement using the force-based tracking device, the force-time integral (impulse) must be reversed. In a torque-based tracking device, the torque-time integral (rotational impulse) must be reversed. Integrating these quantities (which can have two or three components) with respect to time is neither intuitive nor easily quantifiable. Thus, force- and torque-based tracking devices present obstacles to the intuitive, accurate, and reproducible input of data.

The article "Tablet-based Valuators that Provide One, Two, or Three Degrees of Freedom" by K. B. Evans, et. al. in Computer Graphics, V 15, No. 3 (Aug. 1, 1981) describes the need for "kinesthetic correspondence", that is, a direct and natural relationship between the hand motions and the corresponding rotations about the three axes. The current invention provides such a direct and extremely natural correspondence between the hand rotating a ball and the rotations about the three axes, and therefore fulfills this long-felt need.

OBJECTS AND ADVANTAGES

Accordingly, it is an object and advantage of this invention to provide an improved trackball device for the input of three-dimensional signals into a computer system.

It is a further object of this invention to locate the rotational sensors of this trackball in a hemisphere below an equator and to provide a method to transform the signals corresponding to measured rotations of the ball about arbitrary axes into signals corresponding to rotations about Cartesian (x, y, and z) axes.

It is a further object of this invention to provide tapered rollers to these rotational sensors to allow for a compact design and allow for sensors for all three rotations to be mounted on a single planar circuit board.

It is further object of this invention to use a nonplanar, saddle-shaped retaining ring and thereby expose a large portion of the ball surface such that a ball restricted to a given diameter can provide a larger surface area through which the user can continuously manipulate it.

It is a further object of this invention to expose this large area in adjacent quadrants, such that a user's thumb can actuate the ball from a larger range of angles, enabling more comfortable use of the trackball, and enabling greater flexibility as to the location of the trackball relative to the user's hands.

It is a further object of this invention to provide a method of transforming the rotations measured about substantially arbitrary axes to rotations about the standard Cartesian axes.

It is a further object of this invention to provide a method to quantify the accuracy of these transformed measurements.

It is a further object of this invention to transform 3-D rotations into 2-D rotations, so that a 3-D trackball can also function as an improved 2-D trackball in order that the single trackball is compatible with both 2-D and 3-D software. Furthermore, the transformed 2-D signals from the 3-D trackball make it functionally equivalent to both the front-mounted and top-mounted standard 2-D trackball.

It is a further object of this invention to locate this trackball in a portable computer base, so that the front face of the ball can be adjacent to the front face of the portable computer base, and the top face of the ball can be adjacent to the top face of the portable computer base.

It is a further object of this invention to integrate this trackball into the front edge of a standard keyboard, so that the advantages afforded by this design can be realized without using any additional space or adding any new components to the computer system relative to commonly known trackballs.

It is a still further object of this invention in a separate embodiment to allow a user to impart rotation about the x- and y-axes, the x- and z-axes, and the y- and z-axes by translation (sliding) exposed z, y, and x faces of the ball.

It is a further object of this invention to provide this improved trackball using a simple design which can be easily and inexpensively manufactured and can fit into a compact enclosure. Accordingly, in this design the three rotational sensors can be of the same type, can be of the standard electromechanical type, and can be located in a nearly arbitrary manner to facilitate ease of manufacture and compactness. The corrections for the nonorthogonal measurement directions which result are compensated by a transformation procedure which can be very inexpensively incorporated into the software device driver.

It is a further object to provide a rotational sensor with a simplified mounting and with reduced rotational friction.

It is a still further object of this invention to provide flexibility in the placement and orientation of the rotation sensors.

This invention enables the intuitive, accurate entering of both 2-D and 3-D rotation signals through rotation of a single ball. It provides a very direct and intuitive manner for entering 3-D rotations into a computer, namely, by performing those 3-D rotations on the ball. It enables all of these signals to be entered by the single thumb of a user.

Still further objects and advantages will become apparent from a consideration of the ensuing description and accompanying drawings.

SUMMARY

A trackball includes a ball retained in a receptacle by a retainer which exposes for manipulation a free area extending over an arc greater than 180 degrees over the ball surface. The trackball has sensors which generate signals corresponding to the rotation about a set of ball axes and a means to generate transformed signals corresponding to rotation about a second set of axes. A tapered roller on a rotating sensor allows the sensor to sense rotations about a ball axis not necessarily parallel to the sensor axis. A method is given to generate a transform signal whose components correspond to rotations about orthogonal axes, where the transform signal is based on rotation measurements about non-orthogonal axes. A sensor has bearings which support a roller shaft at its ends and one of which is spring-loaded to maintain frictional contact between the roller and ball.

BRIEF DESCRIPTION OF THE DRAWING

FIG. 6 is a detailed top view of an alternate, symmetric location of the tapered rollers with the embodiment shown in FIG. 3a.

FIG. 7b is an enlarged front view of a shaft end bearing of the measurement sensor of FIG. 7a.

DESCRIPTION

Figure 1:
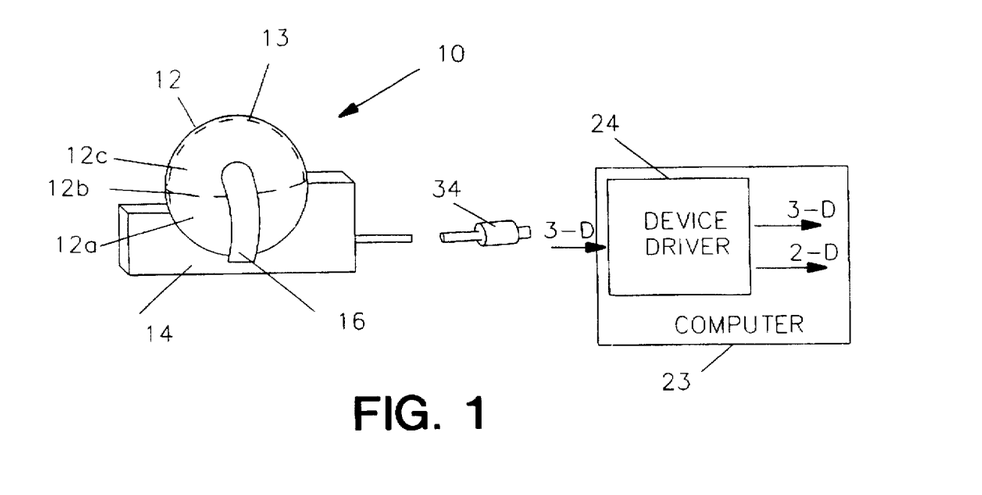
FIG. 1 is a perspective view of a preferred embodiment of the current trackball invention.
Figure 2:
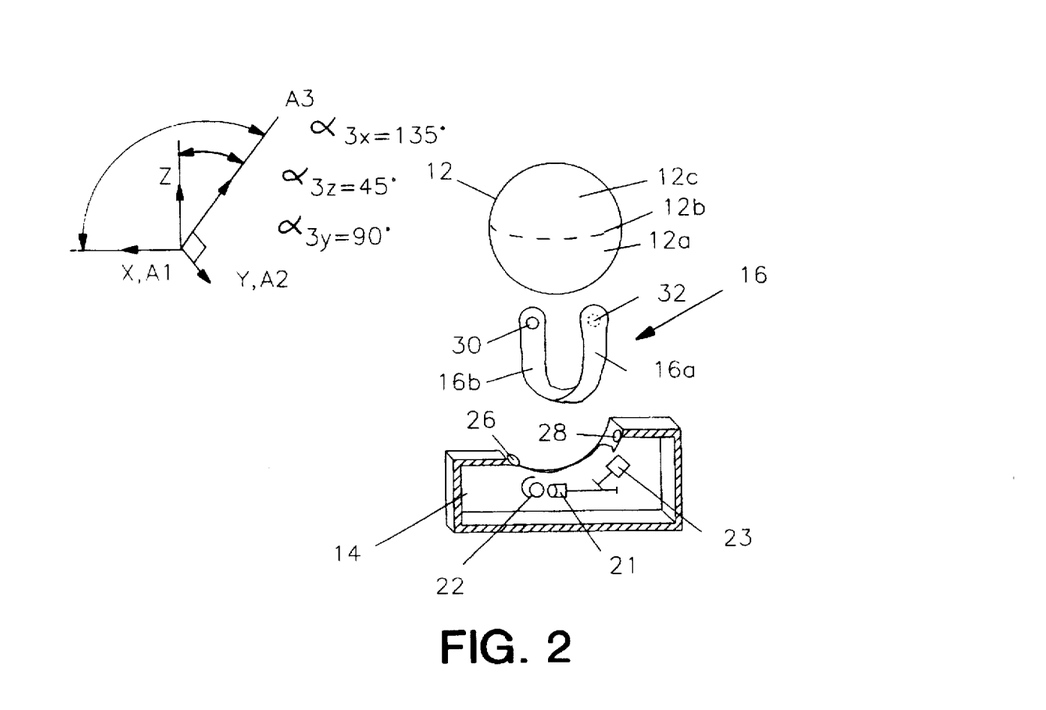
FIG. 2 is an exploded view in partial section of the embodiment of claim 1, which shows the location and orientation of the measurement sensors and the location of the ball supports.

Referring now to FIGS. 1 and 2, the improved trackball may be better appreciated.

A trackball 10 comprises a ball 12, a support 14, a retainer 16, three electromechanical sensors 21, 22, and 23, and a set of four low-friction pads 26, 28, 30, and 32 attached to support 14 and to retainer 16. The combination of support 14 and pads 26 and 28 form a receptacle which is sized to hold the ball. The combination of pads 26, 28, 30, and 32 support and contain (retain) ball 12 within the support members 14 and 16 of trackball 10, and allow rotation of the ball 12 with respect to the trackball 10. A pair of arms 16a and 16b of retainer 16 extend over a first hemisphere 12a, across a great circle 12b, and over a second hemisphere 12c. Trackball 10 can be connected to a suitably configured port on a computer via a cable and connector 34 and can be used in conjunction with standard buttons in any convenient location.

Because a free area with an angle of greater than 180 degrees, such as great circle 13, of the surface of ball 12 is available for the user to grasp, the retainer arms 16a and 16b may be made sufficiently flexible to enable the user to pull ("snap") the ball in and out of position for periodic cleaning. This obviates the need for a complex and bulky engagement and disengagement mechanism. The retainer arms 16a and 16b should also be sufficiently stiff to retain the ball and maintain the physical integrity of the ball and trackball under reasonably expected shocks and forces imparted to the ball 12 by the user during its use.

The three rollers 21, 22, and 23 frictionally engage ball 12 and are attached in the standard manner to rotational sensors of the standard electro-optomechanical type (not shown), which generate signals that correspond to the degree of rotation of the ball 12.

In conjunction with a computer 23, a software device driver 24 receives these signals sent by the sensors 21, 22, and 23 via connector 34. The software device driver 24 may be a program resident in the computer memory which may scale and transform the measurements. The software device driver 24, in turn, generates a signal that can correspond to translational and/or rotational coordinates, or to a cursor position on the screen. The software device driver 24 makes these transform signals available to programs running on the computer, and may allow these programs to switch the transformation of the signals from 3-D to 2-D.

Low friction pads 26, 28, 30, and 32 support and contain ball 12 in the preferred embodiment. Alternately, rollers 21, 22, and 23 could also support ball 12. However, this introduces the design constraint that there must be a single common location for both the support member and the rotation sensor. Furthermore, a ball supported by frictionally engaged rollers tends to align its rotation with the rotation of one of the rollers. Once so aligned the static coefficient of friction must be overcome to break the tractional engagement between the roller and ball. In contrast, a pad support introduces no such preferential directions. An additional advantage of pads is that their compactness allows for great flexibility in locating them in a given design.

In describing the rotational axes of ball 12 and the locations of the other trackball components, it is most useful to orient the coordinate system with respect to a stationary frame of reference, rather than with rotating ball 12. Accordingly, in the mutually orthogonal Cartesian axes in FIGS. 1 and 2, the z-axis is vertical, the y-axis is aligned parallel to the longer dimension of the retainer 16, and the x-axis is aligned parallel to the longer dimension of the housing 14. The coordinate origin is at the ball 12 center. In this embodiment, the bottom hemisphere of a stationary sphere that coincides with the surface of the ball 12 ($z<0$) is defined as a first hemisphere 12a, the top hemisphere ($z>0$) as a second hemisphere 12c, and the great circle at $z=0$ as an equator 12b.

Referring to FIG. 2, in this preferred embodiment roller 21 is located near the bottom (negative z extreme) of ball 12. Its axis of rotation is parallel to ball axis A1 (the x-axis), and it rolls along a meridian of ball 10 at $x=0$, generating a signal that corresponds to the rotation of ball 10 about the x-axis. Roller 22 is located at a position forward and slightly above roller 21. Its axis of rotation is parallel to ball A2 (the y-axis), and it rolls along a meridian of ball 10 at $y=0$, measuring the rotation of the ball 12 about the y-axis. However, contrary to the comments in U.S. Pat. No. 5,019,809, in this invention the third sensor 23 is not required to be located at the equator ($z=0$), in order to measure the third component of rotation. Its axis is parallel to the A3, which is not parallel to the z-axis. The measurement axes A1, A2, and A3 are "nonorthogonal", by which it is meant that they are not mutually orthogonal, so that the relative angle between at least one pair of axes is not 90°. The rotation of the ball 12 about the orthogonal Cartesian (x-y-z) axes can be determined indirectly from the combination of nonorthogonal rotation measurements using a transformation procedure described below. This permits all three sensors to be clustered in a region located away from the exposed surface of the ball, and thereby allows for a large portion of ball 12 surface to be exposed to the user's fingers for manipulation.

In typical current art trackballs, the ball is retained in the housing by a generally circular and planar retaining ring. In order to contain the ball, the diameter of the circular retainer must be less than that of the ball and the ball is trapped between the ring and the rest of the trackball apparatus.

Therefore, the exposed portion of the ball is confined within a portion of a hemisphere of the ball protruding through the retainer, which is less than a full hemisphere. In contrast, the current invention uses a nonplanar retainer 16, with which the exposed area of the ball can extend far beyond the bounds of a hemisphere. This allows a greatly increased portion of the surface of ball 12 to be exposed. When used in combination with three sensors 21, 22, and 23 clustered as described above, this extended area can be exposed even in a fully 3-D trackball.

This has several very important new implications. First, the increased solid angle of the sphere exposed enable the ball 12 of a given diameter to have increased exposed area. Second, the exposed area can be accessed from a range of angles. Third, all three rotations can easily be imparted to the ball by a single finger of the user. Fourth, the abundant exposed ball area and the flexibility in sensor location allow this design to be used in novel configurations and applications. The compactness, simplicity, and ease of manufacture of this design should enable it to be routinely included in keyboards and in laptop computers.

Figures 3A, 3B:
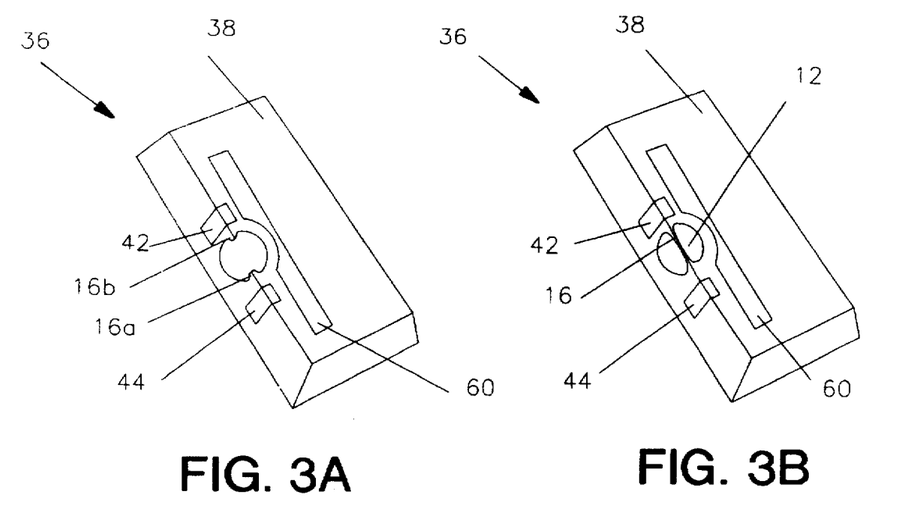
FIG. 3a is a perspective view of another preferred embodiment of the invention in which the support is tilted forward and mounted in the front portion of a keyboard.
FIG. 3b is a perspective view of a variation of the embodiment of FIG. 3a in which two areas of the ball are exposed.
Figure 4:
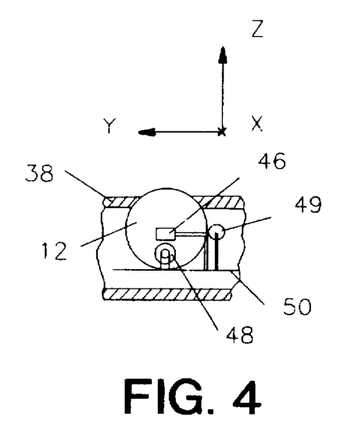
FIG. 4 is a rear view of the embodiment shown in FIG. 3a in partial section showing the locations of the rollers.
Figure 5:
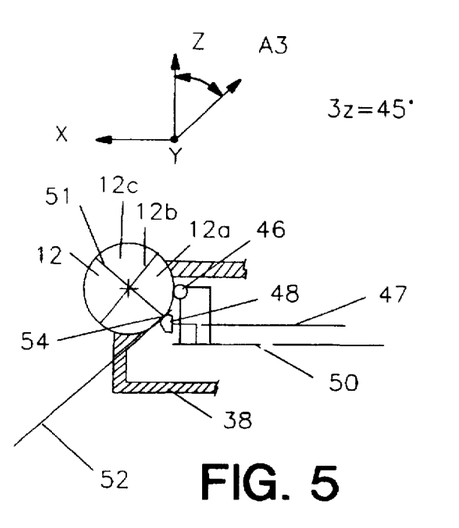
FIG. 5 is a side view of the embodiment shown in FIG. 3a in partial section showing the manner of contact of a tapered roller.

Another preferred embodiment, which uses a tapered roller, is described in FIGS. 3–5. FIG. 3a shows a trackball 36 mounted in the front edge of a computer component housing such as a laptop computer base or a keyboard 38. The top (greater z) and front (greater x) surfaces of ball 12 are exposed and the second hemisphere is tilted in the x-direction (toward the user). The top of ball 12 is generally flush with or slightly above the top surface of keyboard 38, and the front of ball 12 is generally flush with the front of keyboard 38. Two arms 16a and 16b retain ball 12. The arms 16a and 16b may be shaped to smoothly blend in with the top and front surfaces of keyboard 38, so that the perimeter of the cavity in keyboard 38 through which the ball 12 protrudes is saddle-shaped. Buttons 42 and 44 are adjacent to ball 12 so that they are also easily accessible by the user's thumbs while typing. Like ball 12, buttons 42 and 44 have surfaces oriented to respond to contact from the thumbs from the top, front, or from any angle between.

FIG. 3b shows a variation of FIG. 3a in which retainer 16 forms a continuous bridge across the ball and provides two distinct exposed areas of the surface of ball 12.

The embodiment of FIG. 3a is shown in rear and side section views in FIGS. 4 and 5, respectively. Rollers 46 and 49 and tapered roller 48 are all oriented with all three roller axes of rotation parallel to a circuit board 50. This simplifies the manufacture of the design. Fully 3-D rotation signals can be produced by these rollers as described below.

In response to rotation of a body about a given rotation axis, a point on the body's surface moves normal to that rotation axis. Where the surface of body is symmetric about the rotation axis (such as in a circular cylinder or tapered circular cylinder), that motion is also tangential to the surface.

Typically a rotation sensor has such an axisymmetric circular cylinder (roller) frictionally engaged with the ball of a trackball. The ball contacts the cylinder in a small area about a contact point. In absence of a surface contour discontinuity (such as a cusp), the tangent planes of the ball and cylinder surfaces overlap at the contact point. The roller surface is constrained to move in a direction perpendicular to its roller axis, and measures ball movement in that direction. Thus, the roller measures ball rotation on a great circle passing through the contact point and whose tangent at the contact point is perpendicular to the roller axis.

Referring now again to FIGS. 4 and 5, standard cylindrical roller 46 responds to rotations about the y-axis. Tapered roller 48 responds to motion of the surface of ball 12 along great circle 51, which passes through contact point 54 and whose tangent is out of the page and normal to a roller axis 47 of roller 48 at contact point 54. The translational motion of the ball surface that is measured at the contact point 54 is in the y-direction (out of the page). As seen in FIG. 5, contact point 54 is located 45 degrees below the center of ball 12 so that the great circle 51 is oriented normal to ball axis A3. Thus, the motions measured by tapered sensor 48 along great circle 51 correspond to ball rotations about ball axis A3. The kinematics of such rotating bodies are described in "Kinematics and Dynamics of Machines", by G. H. Martin.

Using the signals from two of the sensors enables trackball 36 of FIGS. 3–5 to be compatible with standard 2-D trackballs of the current art. Rotation signals generated by sensor 46 correspond directly to rotations about the y-axis of a standard trackball. Rotations about either the x or z-axis cause tapered sensor 48 to generate signals which can be interpreted as rotations about the x-axis of a standard trackball. Thus, both 2-D components of rotation can be imparted to the rollers by sliding either the top surface or the front surface of the ball.

Figure 6:
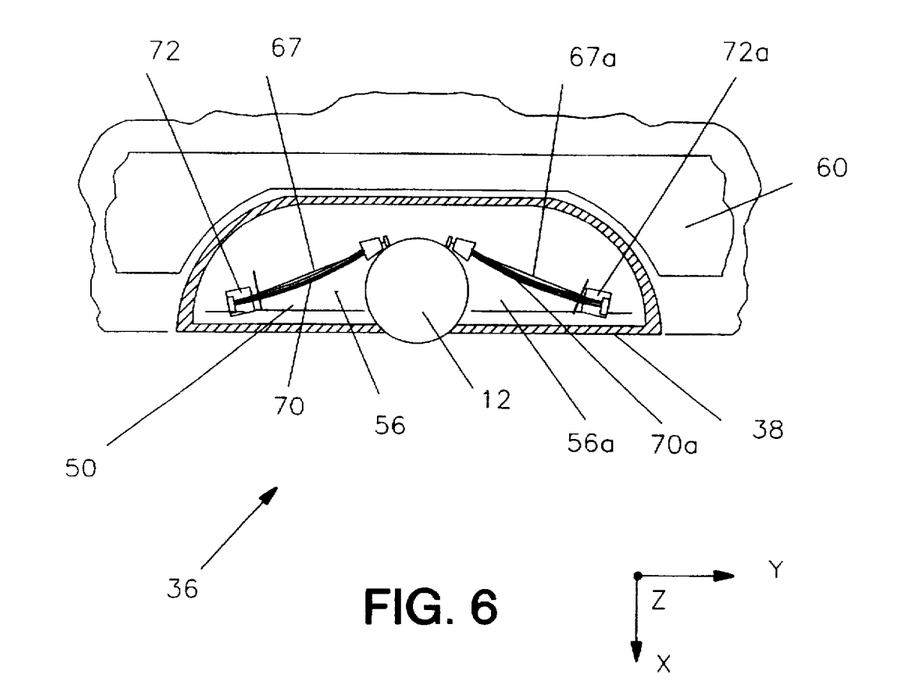
Figure 6A:
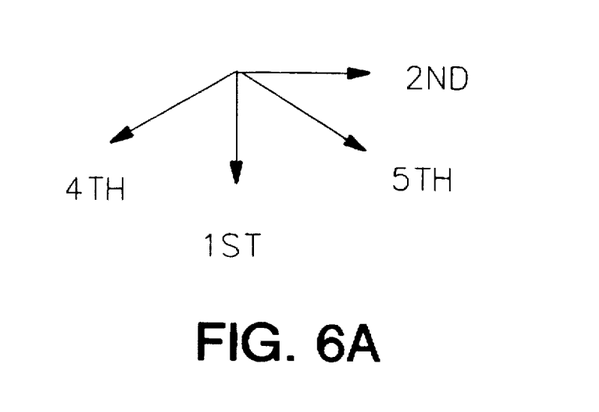
FIG. 6a defines the nomenclature of the coordinate axes for transformation of two axes, showing the 4th and 5th (sensing) axes and the 1st and 2nd (transformed) axes.

In FIG. 6a, a system for nomenclature of the axes in this transformation is defined. The 4th and 5th axes are the sensing axes. One rotation sensor senses ball rotation about the 4th axis and the other rotation sensor senses ball rotation about the 5th axis. The 1st and 2nd axes are the transformed axes. The transformation procedure converts the rotations from rotations about the 4th and 5th axes to rotations about the 1st and 2nd axes. In this example the 1st axis is the x-axis and the 2nd axis is the y-axis. This transformed coordinate information is related to general x and y coordinate information. This general x and y coordinate information is typically input to a computer for cursor control.

Figure 6B:
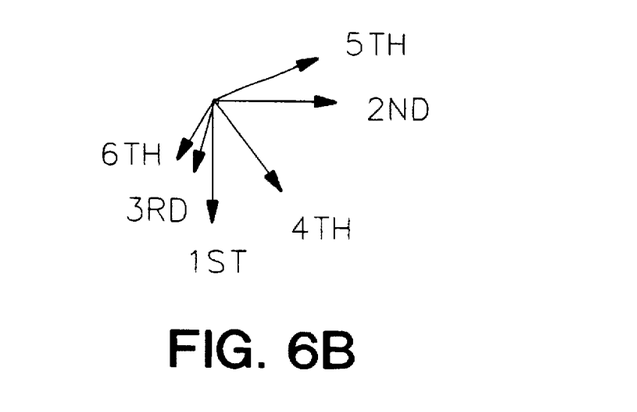
FIG. 6b defines the nomenclature of the coordinate axes for transformation of three axes, showing the 4th, 5th, and 6th (sensing) axes and the 1st, 2nd, and 3rd (transformed) axes.

In FIG. 6b, an analogous system for nomenclature of the axes in a three-dimensional transformation is defined. The 4th, 5th, and 6th axes are the sensing axes. Rotation sensors sense ball rotation about the 4th, 5th, and 6th axes. The 1st, 2nd, and 3rd axes are the transformed axes. The transformation procedure converts the rotations from rotations about the 4th, 5th, and 6th axes to rotations about the 1st, 2nd, and 3rd axes. In this example the 1st axis is the x-axis, the 2nd axis is the y-axis, and the 3rd axis is the z-axis. This transformed coordinate information is related to general x-y-z coordinate information. This general x-y-z coordinate information is typically input to a computer for cursor control or for translation or rotation of an object about three axes.

Thus, in contrast to a standard roller, tapered roller 48 is capable of sensing rotations about an axis which is not parallel to its own axis. In this way, all three rollers 46, 48, and 49 can be mounted parallel to circuit board 50, even though the rotation measured by roller 48 is about a ball axis which is not parallel to circuit board 50. As will be described below, fully 3-D rotational signals can be generated from the three sensors, all of which can be mounted parallel to a single circuit board using the simple coplanar mounting techniques used in current 2-D trackballs. The taper is needed because the transformation analysis below will show that three nontapered rollers whose roller axes were parallel to a single plane result in a matrix that could not be inverted (i.e., is singular). The novel use of tapered roller 48 to measure a component of ball rotation out of the plane of circuit board 50 makes 3-D measurements possible using three sensors whose roller axes are parallel to a single plane.

FIG. 6 shows an alternate preferred embodiment with tapered rollers. Sensors 56 and 56a are of the same design and are mounted symmetrically on opposite sides of an x-z plane, so that the entire trackball assembly 36 is elongated and mounted adjacent to the front edge of keyboard 38. The flexibility afforded by the use of the tapered rollers combined with the transformation method enables trackball 36 to be laid out in a compact configuration appropriate for the geometrical constraints of the particular mounting. In this mounting, sensors 56 and 56a can fit into a normally unused space beneath and in front of a spacebar 60 (toward the user). In current art trackballs, the orthogonally mounted sensors preclude such a design.

Figure 7A:
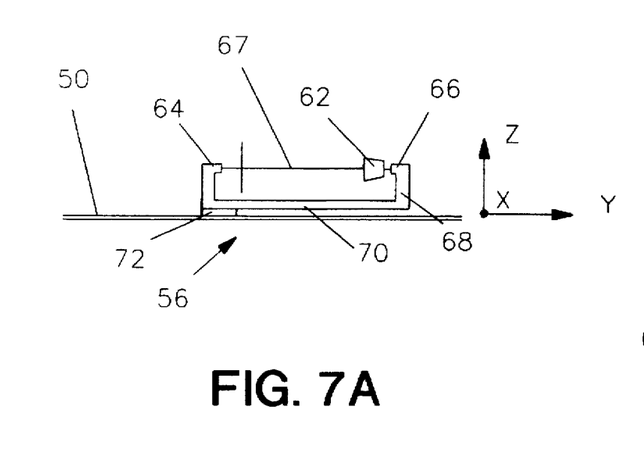
FIG. 7a is a detailed front view of one of the measurement sensors, including the tapered roller, shaft, and end bearings.

Referring to both FIGS. 6 and 7a, a distal (to the ball) end 72 of a spring member 70 of sensor 56 is attached to circuit board 50. Spring member 70 and a strut 68 provide cantilevered support of bearing 66. Together with bearing 64, these components form the shallow "U" configuration of FIG. 7a.

Spring member 70 is of rectangular cross-section, and substantially thicker in its z-dimension than in its x-dimension. The thicker z-dimension results in spring member 70 being very stiff against bending and movement in the z-direction. As a result, there is very little tilting of strut 68, and very little movement of bearing 66 in the axial (z) direction. Spring member 70 acts as a rigid clamp which contains shaft 67.

In contrast, the x-dimension of spring member 70 is smaller, which reduces the stiffness against its bending in the x-direction. This bending in the x-direction of spring member 70 allows for movement in the x-direction of cantilevered strut 68 and bearing 66. This flexure in spring member 70 is used to apply a radial preload force between roller 62 and ball 12 even when ball 12 shifts. The need for a separate spring to apply this force is obviated.

Figure 7B:
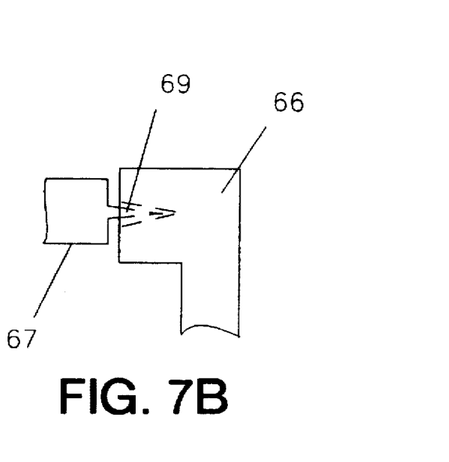

FIG. 7a details sensor 56 with a tapered roller 62. Bearings 64 and 66 contain and support both the axial thrust and a radial preload force on roller 62. The shaft is of larger diameter in its central portion to maintain stiffness and provide more area for attachment of roller 62. One end 69 of a shaft 67 detailed in FIG. 7b is typical of the reduced diameter of the ends of shaft 67 within its supporting bearings 66 and 64. As a result, the frictional force resisting rotation of shaft 67 inside bearings 64 and 66 acts with a lesser moment arm, resulting in a lower frictional torque. The cavity in bearing 66 is of slightly larger diameter than the reduced diameter of shaft end 69 to enable a tilting between shaft end 69 and the cavity in bearing 66 during flexure of spring member 70.

An additional advantage of a tapered roller such as tapered roller 62 is compactness. In current art sensors, the roller is usually connected via a shaft to an optical sensing wheel of larger diameter. The roller and shaft are parallel to the ball surface. Therefore, a long shaft connecting the roller and sensing wheel is required to prevent interference between the sensing wheel and the ball. In contrast, with tapered rollers, the shaft generally can point away from the ball. The shaft need not be as long to allow the sensing wheel to clear the ball surface.

Figure 8:
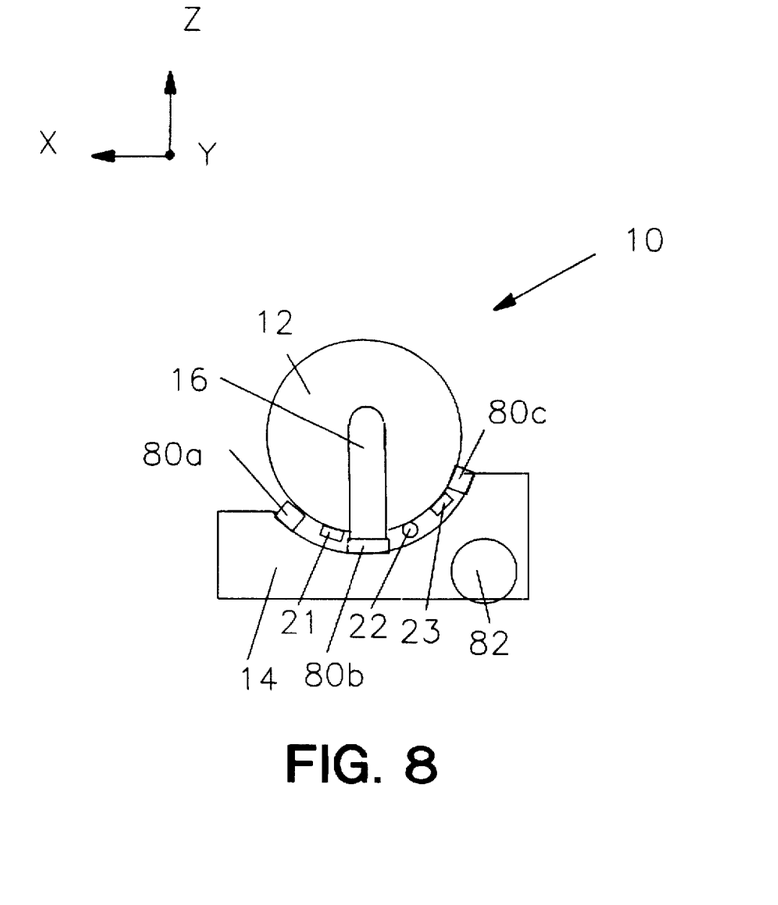
FIG. 8 is a side view of an embodiment of the invention which includes measurement of force and translation.

A last preferred embodiment is illustrated in FIG. 8. This embodiment combines the rotation of ball 12 described for the embodiment of FIG. 1 with a measurement of force and translation. Force sensors 80a, 80b, and 80c measure the force applied to the ball. Mouse ball 82 measures the translation of the trackball 10. Translation could alternatively be input using a trackpad or thumbwheel.

The means by which the various signals generated by the clustered rollers are processed is now discussed. The object of this procedure is to convert the signals generated by rollers of substantially arbitrary orientation into signals corresponding to rotations about the standard Cartesian axes. This is accomplished by first generating influence factors for the transformation and second by using these influence factors to transform the signals.

Referring to FIG. 2, rollers 21, 22, and 23 respond to rotations $R_1$, $R_2$, and $R_3$ (components of the vector quantity $R_I$) about first, second, and third ball axes A1, A2, and A3, respectively. In the simplest case these ball axes are mutually orthogonal and coincide with the x, y, and z (Cartesian) axes. In this simple case the rotations correspond simply to the rotations $R_x$, $R_y$, and $R_z$ (components of the vector quantity $R_x$). However, this is not necessary. In fact, as will be shown below, all three Cartesian components of rotation can be deduced from a set of rotations measured about any three axes that are linearly independent (i.e., three axes which are not oriented parallel to a single plane). The rotations from these three linearly independent ball axes can also be transformed into rotations about any other fourth, fifth, and sixth ball axes.

The rotational velocities about each roller axis that will arise due to rotations about each Cartesian axis can be directly measured. Equivalently, the rotations can be calculated as the direction cosines $C_{ij}$ of each ball axis with respect to each Cartesian axis ($C_{ij}=\cosine(\alpha_{ij})$). For example, in FIG. 2 the angle of ball axis A3 with respect to the z-axis ($\alpha_{3z}$) is 45 degrees, so that for the embodiment of FIG. 3, $C_{1z}=\cosine(45 \text{ degrees})=0.707$. The resulting equations are:

$$R_1 = C_{1x} R_x + C_{1y} R_y + C_{1z} R_z$$

$$R_2 = C_{2x} R_x + C_{2y} R_y + C_{2z} R_z$$

$$R_3 = C_{3x} R_x + C_{3y} R_y + C_{3z} R_z$$

or, in matrix and vector form, $$R_I = C R_x$$

However, in the operation of a trackball, the inverse problem must be solved. In operation, the sensor output signals $R_I$ are known and are used to generate signals that represent the rotation of ball 12 about the Cartesian axes $R_x$. This problem can be solved using the inverse of C:

$$R_x = C^{-1} R_I$$

The inverse of C exists only when the three rows of C are linearly independent. This corresponds physically to the situation where all of three of the sensing axes A1, A2, and A3 which do not share a plane. Measurement errors scale with the a parameter of the matrix $C^{-1}$ known as the "stiffness". The stiffness is defined as the quotient of the maximum eigenvalue over the minimum eigenvalue, $$\lambda_{max}/\lambda_{min}$$

This can be illustrated with two simple examples.

In the case in which the measuring axes are coincident with the Cartesian axes, the direction cosine matrix is the identity matrix, in which all off-diagonal matrix elements are zero:

$$C = \begin{vmatrix} 1 & 0 & 0 \\ 0 & 1 & 0 \\ 0 & 0 & 1 \end{vmatrix}$$

The inverse of C, $C^{-1}$ is also the identity matrix, which has the eigenvalues [1,1,1], and a resulting stiffness of 1.

A slightly more complex case is shown in FIG. 2. $R_1$, $R_2$, and $R_3$ are the rotations about axes A1, A2, and A3, respectively. Sensor 23 is skewed by an angle of 45 degrees below the z plane, so that its axis of rotation A3 is in the x-z plane, midway between the z and negative x axes. The entries in the third column of C are then:

$$C_{3x} = \cos(\alpha_{3x}) = \cos(135°) = -0.707$$

$$C_{3y} = \cos(\alpha_{3y}) = \cos(90°) = 0$$

$$C_{3z} = \cos(\alpha_{3z}) = \cos(45°) = 0.707$$

so that C becomes:

$$C = \begin{vmatrix} 1 & 0 & 0 \\ 0 & 1 & 0 \\ -.707 & 0 & .7071 \end{vmatrix}$$

and its inverse becomes:

$$C^{-1} = \begin{vmatrix} 1 & 0 & 0 \\ 0 & 1 & 0 \\ 1 & 0 & 1.4141 \end{vmatrix}$$

The eigenvalues of $C^{-1}$ are [1,1,1.414], so that the resulting stiffness is 1.414. The eigenvalues and inverse of the matrices may be calculated using standard linear algebra procedures, or may be computed using a commercially available matrix package such as Macsyma™, available from Macsyma, Inc. of Arlington, Mass.

This stiffness of the matrix quantifies the sensitivity of the output of the transformation steps to errors in the input signal. In this simple 45 degree skewing case, this can be also be seen by noting that the equation for the x and y rotations are directly measured ($R_x = R_1$; $R_y = R_2$) and that $R_z = R_1 + 1.414 R_3$, so that the signal (and its errors) in measuring $R_3$ are in fact amplified by a factor of 1.414 in $R_z$. In view of the fact that typical rotation sensitivities of trackballs are measured in thousandths of an inch, this transformation error is not significant in comparison to that introduced by the human hand. The amplification of errors introduced by drag in the rotation of the rollers is also-be small when the rollers have low-friction bearings which introduce little resisting torque to imposed rotations and allow the rollers to roll freely.

If desired, the tendency in some current trackballs for the ball rotation to become preferentially aligned with an orthogonal roller axis can be reproduced from the signals from nonorthogonal signals. For example, a second transformation could be applied to the transform signal corresponding to the Rx, Ry, and Rz rotations. This second transformation may use a rule that if Rz is less than 10% of Rx and Rz is less than 10% of Ry, set Rz to zero. This allows the user to manipulate x and y components data and avoid unintended drift of the z component.

Figure 9A:
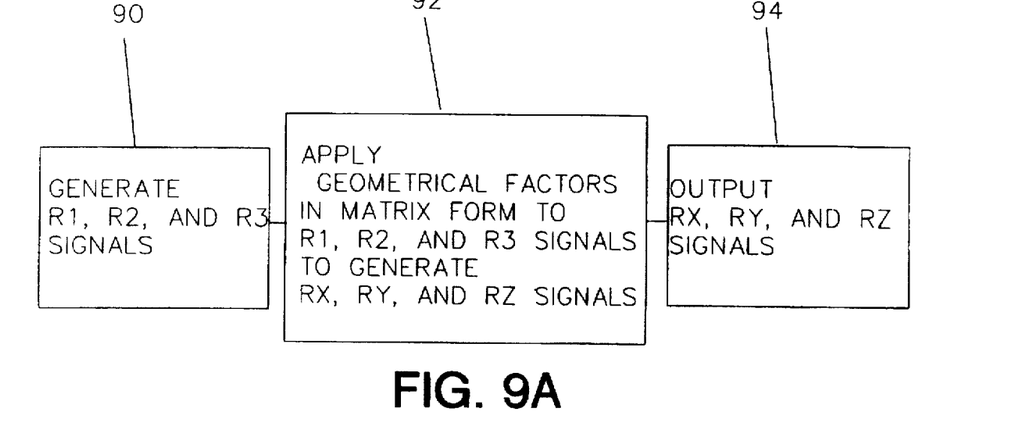
FIG. 9a is a flow chart describing a method of processing signals generated by nonorthogonal measurement sensors.

This transformation method is summarized in the block diagram of FIG. 9a. Signals R1, R2, and R3 representing rotations about a set of nonorthogonal axes are generated from the sensors in step 90. In step 92 the signals are transformed to rotations about a second set of axes which usually are mutually orthogonal. This transformation is based on factors relating the geometrical orientation beween the two sets of axes as described above. In step 94, new signals corresponding to the rotations Rx, Ry, and Rz about the second set of axes are output.

Figure 9B:
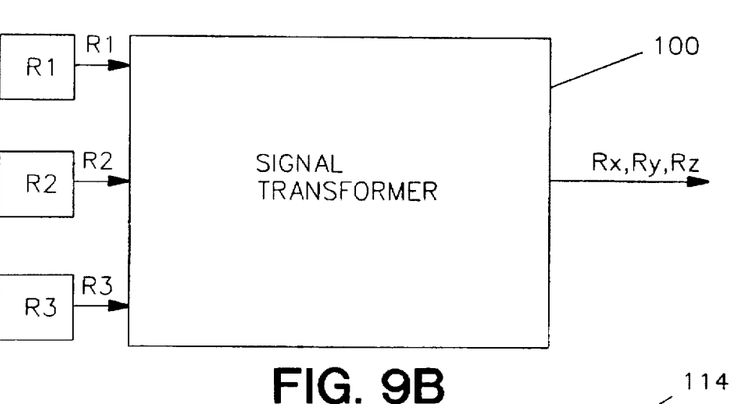
FIG. 9b is a flow chart detailing a method of processing signals within a dedicated microprocessor.

This procedure can easily be incorporated into the software device driver 24 in FIGS. 1 and 9b. It allows the rotation sensors to be located at points which can accommodate efficient ergonomic design and manufacturability. The procedure has been reduced to a straightforward expression in linear algebra, so that it can provide the designer with insight as to the optimal configuration in the design of particular embodiments.

The implementation of this procedure in hardware is described in the block diagram of FIG. 9b. The three signals corresponding to rotation measurements R1, R2, and R3 are input into a dedicated microprocessor 100. The signals are converted to digital signals either within the measurement sensors or within the signal transformer. The transformations to measurement signals corresponding to rotations Rx, Ry, and Rz are performed by a microprocessor within the signal transformer 100. The signal transformer 100 may be integral with the trackball 10, so that the output signals produced from the trackball 10 would mimic those produced from a standard trackball with orthogonal sensors.

Figure 9C:
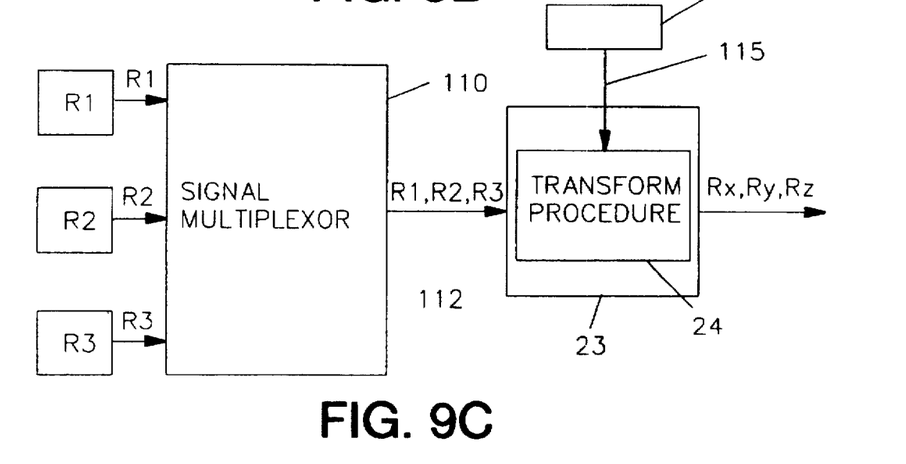
FIG. 9c is a flow chart detailing a method of processing signals using a device driver in a computer.

An alternate implementation of the transformation procedure is described in the block diagram of FIG. 9c. The three measurement signals corresponding to rotations R1, R2, and R3 may be first combined and made into digital signals in multiplexor 110. A combined signal 112 whose components correspond to R1, R2, and R3 may be passed along through a single communications channel. This combined signal 112 is passed into the computer 23. Influence coefficients 115 are retrieved from a location in memory 114, and the transformation procedure is performed on the combined signal 112 to produce the transform signals corresponding to rotations Rx, Ry, and Rz.

Where 2-D output is desired, the 3-D rotations can be reduced to 2-D rotations in several ways. For example, the signals corresponding to $R_x$ could be used verbatim as a signal corresponding to a (2-D) x rotation $R_{x2d}$, and the signals corresponding to $R_y$ and $R_z$ could be summed in the software driver 24 as a signal corresponding to a (2-D) y rotation $R_{y2d}$. The transformation which reduces 3-D rotations to 2-D would then be:

$$R_{x2d} = C_{32} R_x$$

where $$C_{32} = \begin{vmatrix} 1 & 0 & 0 \\ 0 & .707 & .7071 \end{vmatrix}$$

for example. The specific values in $C_{32}$ can be viewed as scale factors and are somewhat adjustable.

Appropriate adjustment of the influence coefficients 114 in FIG. 9c enable the trackball 10 to mimic the operation of a top-accessible 2-D trackball when the top of ball 12 is manipulated, and mimic the operation of a front-accessible 2-D trackball when the front of ball 12 is manipulated. Alternately, the $R_y$ and $R_z$ rotation could be combined electronically in the signal transformer 100 in FIG. 9b. In a third alternative, a single roller such as roller 23 of FIG. 2 oriented at an intermediate angle between the negative x- and the z- axes together with a roller such as roller 22 oriented parallel to the y-axis could directly supply these 2-D signals.

This procedure allows for accurate measurement of 3-D rotations of a ball in which the sensors can be located almost arbitrarily. This facilitates the design of very compact and ergonomic trackballs that can be easily manufactured, such as those in the embodiments described above. This procedure facilitates the introduction of new and non-standard rotational sensors. For example, it may be desirable to use a sensor in which the cylindrical roller is tapered for ease of manufacture or to increase compactness of the trackball. In this case the coefficients in matrix C can be adjusted to reflect the influence of each of the rotations $R_x$, $R_y$, and $R_z$ on the tapered wheel. In fact these coefficients can be determined experimentally after manufacture in a calibration procedure by measuring the response of each sensor to each of a set of known rotations applied to the ball. For example, coefficient $C_{1y}$ would be the measured rotation of sensor 1 in response to a known rotation imposed about the y-axis. These measured constants in C can be entered into the software device driver 24 with no modifications to the electronic or mechanical manufacturing tooling for trackball 10. Thus, this procedure gives the ability to compensate for and correct hardware design errors through software. One can invest in tooling setups for novel and innovative hardware designs for which the influence coefficients are not known a priori, and measure these coefficients from the actual production trackballs. The coefficients can be changed a posteriori without expensive changes to the tooling setup for the design.

CONCLUSIONS, RAMIFICATIONS, AND SCOPE

Accordingly, it can be seen that according to the invention, I have provided for an improved trackball and for a method for transforming skewed rotational ball measurements into the Cartesian rotations of practical interest. While previous trackballs were practical only for 2-D ball rotations, these improvements in usability, ergonomics, and ease of manufacture facilitate a practical 3-D trackball. Furthermore, the increased exposed ball area and the flexibility provided in sensor orientation and location that were developed for the 3-D trackball serve to improve a 2-D trackball as well. Additionally, a method is provided to transform 3-D rotations to 2-D rotations, so that a single trackball can serve both as a 2-D and 3-D input device. These advantages open the possibility of including such an inexpensive and ergonomic 3-D/2-D trackball routinely on a keyboard or a laptop computer.

Although the description above contains many specificities, these should not be construed as limiting the scope of the invention but as merely providing illustrations of some of the presently preferred embodiments of this invention. Various other embodiments and ramifications are possible within its scope. For example, the ball may be mounted with various configurations of buttons and wrist rests for maximum comfort. The trackball may be in a clip-on housing rather than integral with a keyboard component. Optical, infrared, or other types of motion sensors may be used. The flexibility afforded by the improvements of this invention allow for sensors to be mounted on opposite sides of a circuit board, and at locations on the ball and at angles to the ball chosen almost arbitrarily to in order to maximize compactness or any other design constraint in a particular application. Thus the scope of the invention should be determined by the appended claims and their equivalents, rather than by the examples given.

What is claimed is:

1. A trackball device for providing coordinate information relative to first and second axes, said trackball device comprising:

a. a ball;

b. a support having a receptacle sized to hold said ball;

c. a first sensor that generates a first signal that corresponds to the rotation of said ball relative to a fourth axis;

d. a second sensor that generates a second signal that corresponds to the rotation of said ball relative to a fifth axis;

e. means for generating a transform signal based on said first and second signals, said transform signal having components that correspond to the rotation of said ball relative to said first and second axes, wherein at least one of said fourth and fifth axes differs from said first and second axes such that said at least one of said fourth and fifth axes is non-orthogonal to both said first and said second axes;

such that the transformation of said signals reduces the constraints on the location of said sensors and allows for said trackball device and said sensors to be configured to fit into a restricted space.

2. A trackball device for providing coordinate information relative to first, second, and third axes, said trackball device comprising:

a. a ball;

b. a support having a receptacle sized to hold said ball;

c. a first sensor that generates a first signal that corresponds to the rotation of said ball relative to a fourth axis;

d. a second sensor that generates a second signal that corresponds to the rotation of said ball relative to a fifth axis;

e. a third sensor that generates a third signal that corresponds to the rotation of said ball relative to a sixth axis;

f. means for generating a transform signal based on said first, second, and third signals, said transform signal having components that correspond to the rotation of said ball relative to said first, second, and third axes, wherein at least one of said fourth, fifth, and sixth axes differs from said first, second, and third axes such that said at least one of said fourth, fifth, and sixth axes is non-orthogonal with all pairs of axes from the group of said first, second, and third axes, whereby the transformation of said signals allows for all of said sensors to be positioned below the center of said ball and adjacent to said support and allows a majority of the surface of the top portion of said ball to be accessible for manipulation by a user.

3. The trackball of claim 1, wherein said fourth and fifth axes are nonorthogonal.

4. The trackball of claim 1, wherein said first and second axes are orthogonal.

5. The trackball of claim 1, wherein said trackball is mounted on the front edge of a keyboard.

6. The trackball of claim 5, wherein said first and second sensors are positioned symmetrically about said ball.

7. The trackball of claim 1, further comprising a retainer secured to said support, that retains said ball within said receptacle, said retainer providing an area of the surface of said ball that is free to be touched by a finger of a user, said free area extending along a first great circle of a spherical surface that is coextensive with said ball, through a continuous arc of greater than 180°.

8. The trackball of claim 2, wherein said means for generating a transform signal further comprises means for conducting the following steps:

a. generating first, second, and third digital signals that correspond to said first, second, and third signals, respectively; and b. generating a fourth signal having components which correspond to mathematical combinations of:
   i. numerical values that correspond to said digital signals; and
   ii. a set of factors based on the geometrical relationship between said first, second, third, fourth, fifth, and sixth axes.

9. The trackball of claim 8, wherein said step of generating said fourth signal comprises:
   a. inputting said first, second, and third digital signals to a digital computer;
   b. storing in computer memory variables having values that corresonds to each of said first, second, and third digital signals;
   c. arranging said stored variables into a vector;
   d. retrieving from storage values that are based on the geometric relation between said first, second, third, fourth, fifth, and sixth axes;
   e. arranging said retrieved values into a matrix, said matrix having at least one off-diagonal element which is nonzero; and
   f. generating a signal by multiplying said vector by said matrix.

10. The trackball of claim 8, wherein said step of generating said fourth signal comprises:
    a. inputting said first, second, and third digital signals to a digital transformation processor;
    b. retrieving stored values based on the geometrical relationship between said first, second, third, fourth, fifth, and sixth axes;
    c. amplifying said first, second, and third digital signals based on said retrieved values and summing certain of said amplified first, second, and third digital signals with certain other of said amplified first, second, and third digital signals; and
    d. presenting said summed amplified first, second, and third digital signals as a transformed digital signal.

11. The trackball of claim 2, further comprising a retainer secured to said support, that retains said ball within said receptacle, said retainer providing an area of the surface of said ball that is free to be touched by a finger of a user, said free area extending along a first great circle of a spherical surface that is coextensive with said ball, through a continuous arc of greater than 180°.

12. The trackball of claim 2, wherein said fourth, fifth, and sixth axes are mutually non-orthogonal.

13. The trackball of claim 2, wherein said first, second, and third axes are mutually orthogonal.

14. The trackball of claim 2, wherein all of said sensors are mounted on a single circuit board.

15. The trackball of claim 2, wherein each of said sensors has a component that rotates about a sensor axis, and wherein each of the said sensor axes is parallel to the same plane.

16. The trackball of claim 2, wherein all sensors are mounted below the horizontal great circle on the surface of said ball.

17. The trackball of claim 2, further comprising:
    a. a retainer secured to said support, that retains said ball within said receptacle, said retainer providing two distinct areas of the surface of said ball that are free to be touched simultaneously by fingers of a user, each free area extending over a spherical surface that is coextensive with said ball, through an solid angle of at least 0.5 steradians.

18. The trackball of claim 2, wherein said means for generating a transform signal comprises a software device driver, said device driver being capable of inputting a set of signals corresponding to rotations of said ball, being capable of retrieving from electronic storage a set of influence coefficients based on geometrical relationship of said first through sixth axes, and being capable of outputting said transform signal.

19. The trackball of claim 2, further comprising a sensor that generates a signal which corresponds to rotation of said ball about a ball axis, said sensor comprising a roller that contacts said ball and rotates about a roller axis in response to said ball rotating about said ball axis, wherein said roller axis is at an obtuse angle with respect to the contact plane of the ball at the point of contact between said roller and said ball.

20. The trackball of claim 2, further comprising a force sensor for measurement of force applied to said ball.

21. The trackball of claim 2, further comprising a mouse ball for measurement of the translation of said trackball device.

* * * * *